Nov. 24, 1953     J. ARMSTRONG     2,660,078
FORK STRAIGHTENING PLIERS
Filed April 1, 1950

John Armstrong
*INVENTOR.*

BY

HIS PATENT ATTORNEY.

Patented Nov. 24, 1953

2,660,078

UNITED STATES PATENT OFFICE 2,660,078

FORK STRAIGHTENING PLIERS

John Armstrong, Yonkers, N. Y.

Application August 1, 1950, Serial No. 176,996

3 Claims. (Cl. 81—15)

1

The present invention relates generally to devices for straightening implements and more particularly to a tool for truing or straightening the tines or teeth of forks and similar implements.

Table forks, and particularly those used in public restaurants, are frequently subjected to abnormal uses which cause the tines or teeth to become bent or displaced from their intended positions and when so bent they not only become unsightly and become a source of annoyance and disturbance to their users, but are also frequently made ineffective for their intended purposes. The tines of many forks formed from relatively soft and ductile metal, are frequently easily bent both in normal and abnormal use. Such bending or displacement may occur in either the lateral sense in which they are spread apart or bent together in the same common plane, or they may be deflected above and below this common plane, and frequently the deflections occur in each of these directions. Many prior efforts have been made to provide means and improvised tools for straightening such bent tines, but these prior efforts for the most part have been cumbersome, time-consuming and relatively ineffective.

The present invention is directed to an improved device, preferably in the form of a plier-like tool, within which the tines of a bent or mutilated fork may be inserted and clamped, and the displaced tines moved into their intended alignment in a single, simple operation of the closing of the plier jaws. It is, accordingly, a major objective of the present invention to provide an improved tool for the straightening of the bent tines of a fork or similar implement. A further object of the present invention resides in the provision of a plier-like tool with a plurality of straightening teeth by means of which the bent tines of a fork may be simply and effectively restored to its initial aligned arrangement. A still further objective resides in providing toothed elements for such a plier tool, which may preferably be of the parallel jaw-type, which toothed elements are either fixedly mounted or pivoted upon the plier jaws for insertion between the displaced tines of the fork for moving the deflected tines into their initial or otherwise aligned positions.

Other objects and advantages of the present invention will occur to those skilled in the art after reading the following description when taken in conjunction with the accompanying drawings, forming a part hereof, in which.

Figures 1, 3:
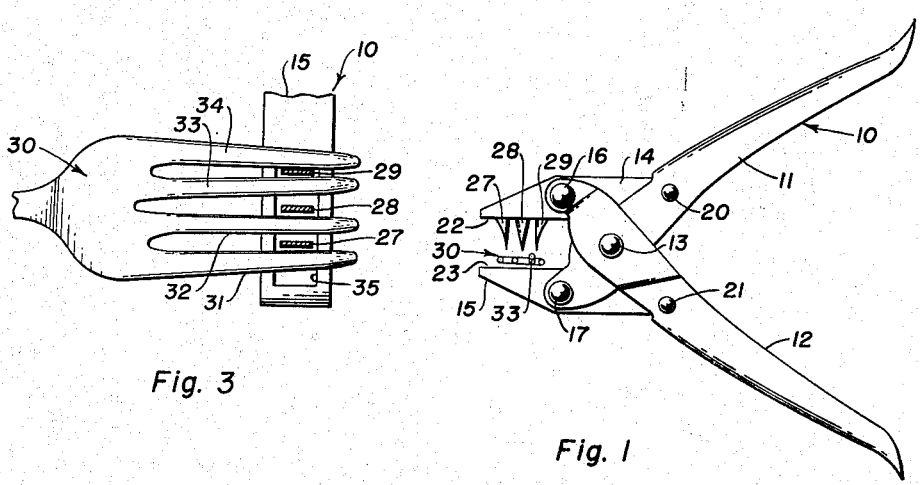
Fig. 1 is a side elevational view of a preferred form of the improved plier type straightening device showing the displaced tines of a fork disposed between the two jaws prior to the straightening operation.
Fig. 3 is a plan view of the bent fork disposed upon the lower jaw of the tool prior to the straightening operation.

Referring now to Fig. 1, the straightening tool is generally indicated by the numeral 10 and comprises the handle portions 11 and 12 which are intermediately pivoted upon the common pivot pin 13. The handle portions 11 and 12 are preferably formed from sheet metal stock into a general U-shape in cross-section with their side portions extending forwardly to form bifurcations which embrace the upper and lower jaw elements 14 and 15, respectively. The handles 11 and 12 are substantially identical with the exception that the outer handle, in the present instance the lower handle 12, has an outwardly offset portion in the region of the common pivot 13 such that it embraces the bifurcated portion of the upper handle 11 where it crosses the same. The upper jaw 14 and the inner extremity of the bifurcated portion of the lower handle 12 are suitably apertured to receive the rivet or pin 16; and the lower jaw 15, as well as the inner extremity of the bifurcated portion of the upper handle 11, are similarly apertured to receive the rivet or pin 17. The upper and lower jaws 14 and 15 are provided with angular slot 18 and 19, respectively, within which the rivet guide pins 20 and 21, extending the bifurcated portion of the upper and lower handles 11 and 12, respectively, are caused to slide as the handles are spread apart or forced together. A spring or other resilient element (not shown) may be provided to cause the plier to be returned to its open position, as shown in Fig. 1, if desired after the manual squeezing pressure exerted against the handles 11 and 12 has been released. The preferred arrangement which has been described thus far and particularly the relationship of the common pivot 13 with respect to the pivot pins 16, 17, 18 and 19, forms a plier of the parallel jaw type but it will be understood that the present improvement is not restricted to use therewith.

Figures 2, 4:
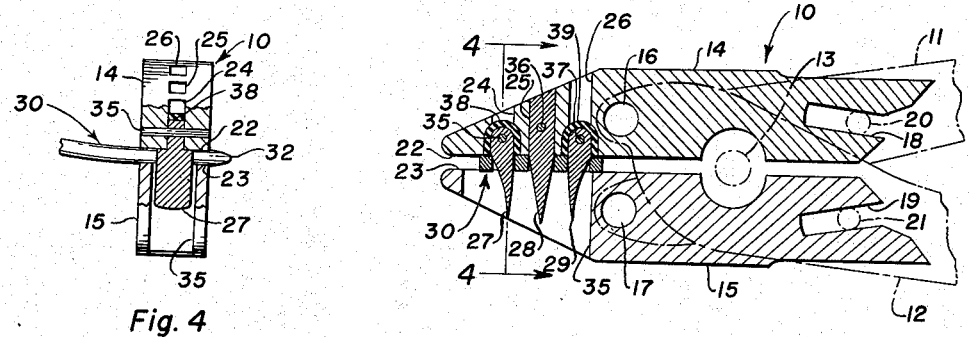
Fig. 2 is an enlarged cross-sectional view of the jaw portion of the tool of Fig. 1 shown in the closed position about the tines of the fork.
Fig. 4 is a cross-sectional view as taken along the lines 4—4 of Fig. 2.
Figure 5:
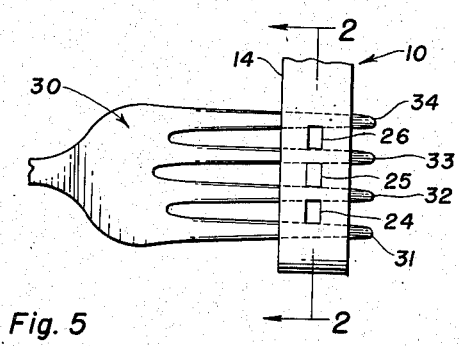
Fig. 5 is a plan view of the jaws and the fork tines shown in Fig. 2 following the straightening operation.

Referring now to Fig. 2, and as supplemented by the remaining figures, the upper jaw 14 is provided with a straight or plain working face 22, and the lower jaw 15 is similarly provided with a like working face 23. The upper jaw 14 is provided with a plurality of vertical slots 24, 25 and 26, which may be rectangular in horizontal cross-section and within which the straightening teeth 27, 28 and 29 are disposed. In the form of the device which has been illustrated three straightening teeth have been provided for use with forks having up to four tines, which is the type of table fork most commonly used, although it will be understood that a greater or lesser number of straightening teeth may be used for the type of fork disclosed, or for other forked implements having a greater or lesser number of tines or teeth.

The fork has been generally indicated throughout the several figures by the numeral 30 and its working portion is comprised of the tines 31, 32, 33 and 34. As indicated in Figs. 1 and 3, one of the tines or teeth, namely 33, has been shown as being deflected or displaced both laterally outwardly as apparent in Fig. 3, and upwardly from the normal horizontal plane of the tines, as indicated in Fig. 1.

Referring again to Fig. 2, the first straightening tooth 27 is pivotally mounted as by the pin 35 extending across the width of the upper jaw 14, and is embraced at its upper end by a rubber or other elastic element 38 which permits the tooth 27 to rock about the axis of the transverse pin 35 and to be resiliently centered by the elastic element 38. The cross-sectional shape of the straightening tooth 27 is preferably unsymmetrical, its pointed portion being preferably nearer the central tooth 28 and its face being progressively curved from its lower point to its upper portion at which it is attached to the jaw 14. The central tooth 28 is preferably fixed within the slot 25 by means of the pin 36 and is preferably symmetrically shaped in cross-section to provide a straight tapered or wedge-like working portion for laterally spacing or separating the inner tines 32 and 33. The inner or third straightening tooth 29 is also pivoted by means of the pin 37 so that it is also rockable about its pivot pin axis and resiliently centered by the resilient element 39. The shape of this tooth 29 is also preferably similar in cross-section to the outer tooth 27 with the exception that it is oppositely disposed or symmetrically mounted about the straightening tooth 28 so that its point is spaced nearer toward the central tooth 28 with respect to its pivot 37. In the design of certain straightening devices it may be desirable to utilize metal springs for centering the articulated teeth 27 and 29 in place of the rubber inserts disclosed in order to provide the desired resilient floating mounting of these outer and inner straightening teeth. The three straightening teeth 27, 28 and 29 are preferably of uniform width as indicated in the cross-section in Fig. 4, so that they bear against the side of the fork tines 31, 32, 33 and 34, with a relatively large area in order that the surfaces of tines which are of relatively soft and ductile material are not scratched or burred. The lower jaw 15 is provided with an enlarged slot 35 to receive the extending portions of the straightening teeth 27, 28 and 29 in the closed position of the pliers.

The operation of the preferred form of the tine straightening device is as follows: With the handles 11 and 12 and the pivotally interconnected jaws 14 and 15 in their opened or separated positions shown in Fig. 1, the tine portion of the bent or mutilated fork 30 is disposed between the separated jaws in a position such as indicated in Fig. 1, in which the points of the straightening teeth 27, 28 and 29 are disposed above the irregular spaces between the relatively displaced tines 31, 32, 33 and 34. In the case of forks having tines which are abnormally displaced, the pivoted teeth 27 and 29 may be deflected sufficiently about their respective axes so that the straightening teeth are initially inserted between the irregular spaces occurring between the displaced tines of the fork. The jaws 14 and 15 of the plier-tool are then brought together by squeezing pressure exerted manually, or otherwise, upon the handles 11 and 12, such that as the jaws reach their fully approaching or closed position as indicated in Fig. 2, and as the deflected tines are caused to slidingly move along the wedging surfaces of the straightening teeth, they are caused to be regularly spaced laterally and are restored to their normal spaced relationship in the same common plane by the wedging effect of the several straightening teeth. At the same time any upward or downward displacement of the tines is corrected by the clamping effect of the working faces 22 and 23 of the upper and lower jaws, respectively.

In some instances it may be desirable to bend all of the tines together while securely gripped in the plier jaws, first in one direction and then in the other, and with respect to the remainder of the body of the fork in order to overcome any tendency of a straightening tine to spring back into a deflected position. In certain straightening operations, it may be desirable to invert or reverse the position of the straightening tool 10 by pressing the deflected tines of the fork 30 upon the straightening teeth as carried by the lower jaw, in the inverted position of the tool, prior to the closing of the tool jaws.

As indicated above, the form of the device disclosed is shown by way of illustration only and the present invention is not to be limited thereto. It will be noted that the straightening device is also capable of use with other toothed implement than forks, such as rakes and the teeth of combs or spear-like implements and it will also be apparent that the jaws of the tool may be power-actuated where greater forces are required to be applied for the straightening purposes.

Other forms and modifications of the present device both with respect to its general arrangement and the details of its respective parts which will become apparent to those skilled in the art are intended to come within the scope and spirit of the present invention as more particularly defined in the appended claims.

I claim:

1. A device for the straightening of the bent tines of a fork implement having three or more tines comprising a plier-like tool, pivotally interconnected jaws associated with said tool for causing said jaws to move in parallel planes, a fixed central tooth carried by a first of said jaws, a pivoted outer tooth carried by said first jaw on each side of said fixed tooth, resilient means for urging said pivoted outer teeth into centered positions, each of said pivoted outer teeth being unsymmetrically wedge-shaped and tapered toward said fixed central tooth, each said jaw having parallel plane faces arranged to engage the upper and lower faces of said tines, said jaws arranged to clampingly approach about the bent tines of a fork implement with said teeth interposed in a deflected position of said pivoted outer teeth between said tines for the straightening thereof whereby the said bent tines are both spatially equalized and straightened to lie in the same flat plane.

2. A device for the straightening of the bent tines of a fork implement having three or more tines comprising a plier-like tool, pivotally interconnected jaws associated with said tool, a fixed tooth carried by a first of said jaws, a pivoted tooth carried by said first jaw on each side of said fixed tooth, resilient means for urging said pivoted teeth into a centered position, each said jaw having parallel plane faces arranged to engage said tines, means for causing said jaws to clampingly approach about the bent tines of a fork implement with said teeth interposed in a deflected position of said pivoted teeth between said tines for the straightening thereof whereby the said bent tines are spatially equalized and straightened to lie in a flat plane.

3. A device for the straightening of the bent tines of a fork implement having three or more tines comprising a plier-like tool, pivotally interconnected jaws associated with said tool for causing said jaws to move in parallel planes, a fixed tooth carried by a first of said jaws, a pivoted tooth carried by said first jaw on each side of said fixed tooth, each said jaw having parallel plane faces arranged to engage said tines, said jaws arranged to clampingly approach about the bent tines of a fork implement with said teeth interposed between said tines for the straightening thereof to lie in the same plane and to be spatially equalized.

JOHN ARMSTRONG.

References Cited in the file of this patent

UNITED STATES PATENTS

| Number | Name | Date |
|---|---|---|
| 224,271 | Brundred | Feb. 10, 1880 |
| 789,193 | Wickham | May 9, 1905 |
| 1,098,696 | Trom | June 2, 1914 |
| 1,113,693 | Rosenberg | Oct. 13, 1914 |
| 1,581,692 | Royall | Apr. 20, 1926 |
| 2,328,747 | Schweidler | Sept. 7, 1943 |